United States Patent [19]

Brooks

[11] Patent Number: 5,073,025

[45] Date of Patent: Dec. 17, 1991

[54] INDEPENDENT POLARIZATION STATE MEASUREMENTS SENSOR

[75] Inventor: Lawrence D. Brooks, Thousand Oaks, Calif.

[73] Assignee: Rockwell International Corporation, El Segundo, Calif.

[21] Appl. No.: 433,887

[22] Filed: Nov. 8, 1989

[51] Int. Cl.[5] .............................................. G01J 4/04
[52] U.S. Cl. .................................... 356/367; 356/364
[58] Field of Search ............... 356/364, 365, 366, 367, 356/368, 369, 370; 250/225

[56] References Cited

U.S. PATENT DOCUMENTS

| | | | |
|---|---|---|---|
| 3,556,662 | 1/1971 | Levenstein et al. | 356/367 |
| 3,992,571 | 11/1976 | Garlick et al. | 178/6 |
| 4,158,506 | 6/1979 | Collett | 356/365 |
| 4,269,511 | 5/1981 | Erwin | 356/368 |
| 4,310,247 | 1/1982 | Korth et al. | 356/365 |

Primary Examiner—Richard A. Rosenberger
Attorney, Agent, or Firm—H. Fredrick Hamann; Harry B. Field; Steven E. Kahm

[57] ABSTRACT

A means of mapping the polarization across a laser beam 1 comprising the steps of dividing the laser beam into six beams 11, 12, 21, 22, 31, 32 each having a different polarization and phase. Measuring the intensity of each beam in charge coupled devices 111, 112, 121, 122, 131, 132, having an array of pixels. Matching the pixels in each array to their proper portion in laser beam 1. Adding the values obtained in each pixel to obtain a composite polarization map.

2 Claims, 1 Drawing Sheet

INDEPENDENT POLARIZATION STATE MEASUREMENTS SENSOR

BACKGROUND OF THE INVENTION

It is important to understand the polarization behavior of a high power laser field to predict system performance and correct factors hindering optimum behavior.

For example, laser beams have their polarizations distorted by the curvature of mirrors and the coatings on the mirrors. By analyzing the distortions of the polarizations in a laser beam the source of the distortion can to isolated and corrections made to improve beam quality.

In the past, polarization measurements have been made for the average polarization of the entire beam. This is useful information for some purposes but does not provide the detailed analysis of a beam necessary to study and improve the beam quality.

SUMMARY OF THE INVENTION

This invention provides a means for mapping the polarization state across a laser beam. The laser beam is split into 6 beams each of which is measured for a different polarization angle and phase. Each beam is incident on a charge coupled device with an array of pixels. The array of pixels allows a mapping of polarization across each beam. The six arrays can be mathematically combined to yield a mapping of the polarization state across the beam. This detailed analysis of the beam can then be used to improve the quality of laser beams by finding and eliminating the cause of polarization distortions.

DETAILED DESCRIPTION OF THE PREFERRED EMBODIMENT

Figure 1:
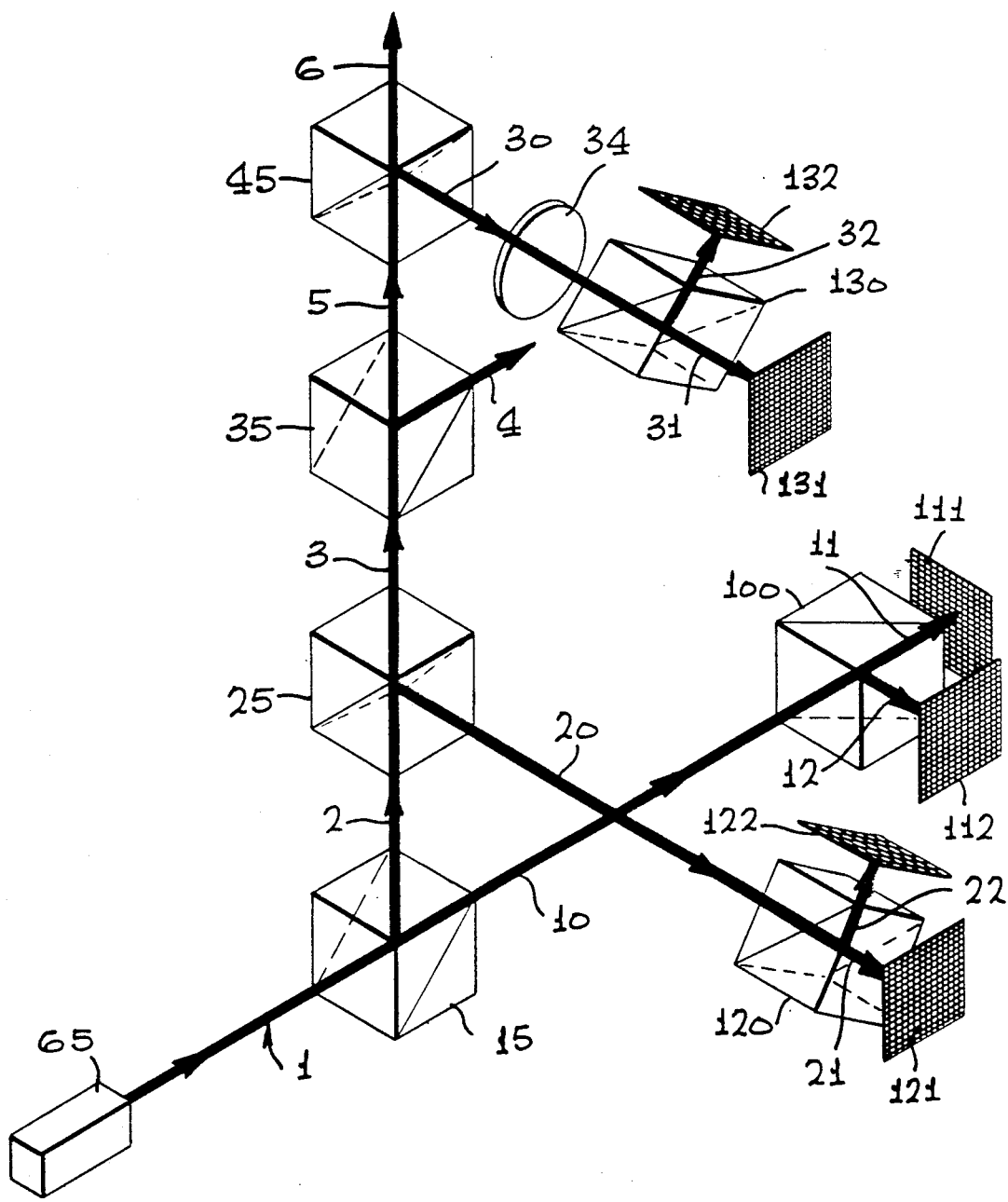
FIG. 1 is a schematic view of the invention.

It is important that the near-field output polarization be uniform in high power lasers. Unfortunately the curvature of the mirrors and the coatings on the mirrors can distort the polarization of the laser beam. It is therefore necessary to examine the polarization of the laser beam at many locations across the beam to see what the beam quality is. This information can then be used to trace the cause of beam polarization distortions so that the beam quality can be enhanced.

To examine the laser beam in detail six views of the laser beam were selected. The polarization angles and phases of each view were picked to fit a mathematical summation formula which is easy to use for combining the six measurements into a composite view of the laser beam.

Referring to FIG. 1 a laser beam 1 which is to be examined enters a non-polarizing beam splitter 15 where the beam is split into two approximately equal portions The transmitted portion 10 is directed to polarizing beam splitter 100, where beam 10 is split into 2 beams. The transmitted beam 11 has a polarization of 0 degrees and a phase of 0 degrees. The reflected beam 12 has a polarization of 90 degrees and a phase of 0 degrees.

The non-polarizing beam splitter 15 reflects beam 2 which is directed to non-polarizing beam splitter 25. Non-polarizing beam splitter 25 is rotated 90 degrees with respect to non-polarizing beam splitter 25. The out-of-plane polarization of reflected beam 2 reflects in-plane polarization for beam 20 and transmits beam 3.

Beam 20 is directed to polarizing beam splitter 120 which is clocked 45 degrees about the optical axis so that it acts like a simultaneous 45 degree and −45 degree polarizer. Polarized beam splitter 120 splits beam 20 into beam 21 having a polarization of 45 degrees and phase 0 and beam 22 having a polarization of −45 degrees and phase 0.

Non-polarizing beam splitter 25 transmits beam 3 to non-polarizing beam splitter 35 which is oriented in the opposite sense of non-polarized beam splitter 15. Beam 5 is transmitted to non-polarized beam splitter 45, which is oriented in the same sense as non-polarizing beam splitter 15. Therefore the vector component parallel to the plane of incidence in non-polarizing beam splitter 15 is the perpendicular component in non-polarizing beam splitter 45.

Beam 30 is reflected from non-polarizing beam splitter 45 and is directed to quarter wave plate 34 which changes the phase of beam 30 by 90 degrees. Beam 30 is then directed to polarizing beam splitter 130, which is clocked 45 degrees about the optical axis so that it acts like a simultaneous 45 degree and −45 degree polarizer. Polarized beam splitter 130 splits beam 30 into beam 31 having a polarization of 45 degrees and a phase of 90 degrees and beam 32 having a polarization of −45 degrees and a phase of 90 degrees.

Beams 11, 12, 21, 22, 31 and 32 are directed to charge coupled devices 111, 112, 121, 122, 131 and 132 respectively. Each charge coupled device has an array of pixels for detecting a portion of the cross section of the beam. The charge coupled device measures the intensity of the light in each pixel. Therefore the array of pixels gives information for mapping out each beam. An array of 32 by 32 pixels may be used to give good results using this method.

A beam expanding telescope 65 may be used to expand the laser beam allowing each pixel to cover a smaller portion of the beam and thus giving more information abut the polarization across the beam.

The beam 1 was split into six components having the polarization and phase coordinates of (0°,0°). (90°,0°), (45°,0°), (−45°,0°), (45°,90°), (−45°,90°). These coordinates were chosen to fit the formula for adding the array of pixels to form a map of the polarization across the laser beam.

The intensity of beam 11, I (0°,0), is $t^2\perp <Ax^2>$ where $t^2\perp$ is the transmissivity of the beam splitter for the perpendicular branch of beam 10.

The intensity of beam 12, I (90°,0) is $t^2\| <Ay^2>$ where $t^2\|$ is the transmissivity of the beam splitter for the parallel branch of beam 10.

The transmissivities $t\perp$ and $t\|$ can be determined from calibrations or Fresnel equations.

The intensity of beam 21 is $I(-45°,0°) = r\perp^2 r\|^2 [<Ax^2> + <Ay^2> - 2<AxAy>\cos\delta]$ and the intensity of beam 22 is $I(45°,0°) = r\perp^2 r\|^2 [<Ax^2> + <Ay^2> + 2<AxAy>\cos\delta]$ where $\delta = \delta x - \delta y$, the phase difference between the polarization components of the input beam 1. The intensity of beam 31 is $I(-45°,90°) = r\perp^2 r\|^2 t\perp^2 t\|^2 [<Ax^2> + <Ay^2> - 2<AxAy>\sin\delta]$. The intensity of beam 32 is $I(45°,90°) = r\perp^2 r\|^2 t\perp^2 t\|^2 [<Ax^2> + <Ay^2> + 2<AxAy>\sin\delta]$.

Where $r\perp$ is the amplitude reflection coefficient for the out-of-plane component and $r\|$ is the amplitude reflection coefficient for the in-plane component.

Since all the non-polarized beam splitters and all the polarized beam splitters are the same, the reflective and transmissive properties are the same in each.

Each array measures a potion of the beam 1. The arrays must be matched so that each pixel in each array measures the same portion of the beam. There are many ways of matching the arrays. A light source can be used as a point to align the arrays. Another method is to use an edge marking such as a thin wire to block a small portion of the beam. Any means of aligning the arrays is acceptable.

The mathematically combining of the arrays by use of a computer into one map of the beam is accomplished by a computer using the data from each pixel.

The coherency matrix which is used here is given by $$\begin{pmatrix} Jxx & Jxy \\ Jyx & Jyy \end{pmatrix}$$

where the elements may be determined from
$Jxx = I(0°; 0°)/t^2$
$Jxy = 0.5r \parallel {}^{-2}r \parallel {}^{-2}\{[I(45°,0°) - I(-45°,0°)] + it \parallel {}^{-2}t \parallel {}^{-2}[I(45°,90°) - I(45°,90°)]\}$
$Jyx = 0.5r\perp{}^{-2}r \parallel \{[I(45°,0°) - I(-45°,0°) - it\perp{}^{-2}t \parallel {}^{-2}[I(45°,90°) - I(45°,90°)]\}$
$Jyy = I(90°,0°)/t^{-2} \parallel$ The distance between the charge coupled devices and the laser beam 1 to be measured must all be equidistant Adjustments must be provided to ensure equal path lengths for each of the six branches of the laser to be measured.

The computer software may be programmed to correct for known distortion effects of some of the optics in the system to enhance the accuracy of the results.

Beams 4 and 6 are not needed and are discarded.

It should be understood that more arrays may be added and another formula for combining the rays may be used. However this would add to the cost.

The number of pixels per array may be varied and the computer software for combining the data from the arrays may vary. However these changes are still within the scope of the invention.

What is claimed and desired to be secured by Letters Patent of the United States is:

1. A method of mapping the polarization across a laser beam comprising, splitting a laser beam into six portions to be measured, each portion having a different polarization, by first passing the laser beam through a first non-polarizing beam splitter which transmits part of the beam and reflects part of the beam, the transmitted part is directed to a first polarizing beam splitter which splits the beam into a first portion having a polarizing of 0 degrees and a phase of 0 degrees and a second portion having a polarization of 90 degrees and a phase of 0 degrees.

the reflected part of the beam from the first non-polarizing beam splitter is directed to a second non-polarizing beam splitter which transmits part of the beam and reflects part of the beam, the second non-polarizing beam splitter is rotated 90 degrees with respect to the first non-polarizing beam splitter, the reflected beam from the second non-polarizing beam splitter is directed to a second polarized beam splitter which is rotated 45 degrees on its optical axis so as to split the incoming beam into two beams a third portion polarized at 45 degrees and a phase of 0 degrees and a fourth portion polarized at −45 degrees with a phase of 0 degrees.

the transmitted part of the beam from the second non-polarizing beam splitter is directed to a third non-polarizing beam splitter which is rotated 90 degrees with respect to the second non-polarizing beam splitter, which splits the beam into a reflected portion and a transmitted portion, the transmitted part of the beam from the third non-polarizing beam splitter is directed to a fourth non-polarizing beam splitter which is rotated 90 degrees with respect to the first non-polarizing beam splitter.

the reflected beam from the fourth non-polarizing beam splitter is directed through a quarter wave plate to a third polarizing beam splitter which is rotated 45 degrees on its optical axis and splits the incoming beam into two beams, a fifth portion which has a polarization of −45 degrees with a phase of 90 degrees and a sixth portion which has a polarization of 45 degrees and a phase of 90 degrees, measuring the intensity of the cross sections of each polarized portion of the laser beam by use of an array of pixels in a charge coupled device, aligning the pixels in each charge coupled device so that the pixels measuring the same portion of the laser beam are matched, combining the data from each matched pixel int h charge coupled device into a mapping of the polarization of a laser beam by use of a computer and the proper algorithm to map the polarization across the laser beam.

2. A method of mapping the polarization across a laser beam comprising.

splitting the laser beam into four portions to be measured, each portion having a different polarization, by first passing the laser beam through a first non-polarizing beam splitter which transmits part of the beam and reflects part of the beam, the transmitted part is directed to a first polarizing beam splitter which splits the beam into a first portion have a polarization of 0 degrees and a phase of 0 degrees, and a second portion having a polarization of 90 degrees and a phase of 0 degrees, the reflected part of the beam from the first non-polarizing beam splitter is directed to a second non-polarizing beam splitter which transmits part of the beam and reflects part of the beam, the second non-polarizing beam splitter is rotated 90 degrees with respect tot h first non-polarizing beam splitter, the reflected beam from the second non-polarizing beam splitter is directed to a second polarized beam splitter which is rotated 45 degrees on its optical axis so as to split the incoming beam into two beams a third portion polarized at −45 degrees and a phase of 0 degrees which is directed to a charge coupled device for measurement and a beam polarized at 45 degrees and a phase of 0 degrees which is dumped, the transmitted part of the beam from the second non-polarizing beam splitter is directed to a third non-polarizing beam splitter which is rotated 90 degrees with respect to the second non-polarizing beam splitter, which splits the beam into a reflected portion and a transmitted portion, the transmitted part of the beam splitter is directed to a fourth non-polarizing beam splitter which is rotated 90 degrees with respect to the first non-polarizing beam splitter, the reflected beam from the fourth non-polarizing beam splitter is directed to fourth non-polarizing beam splitter which is rotated 90 degrees with respect to the first non-polarizing beam splitter, the reflected beam from the fourth non-polarizing beam splitter is directed through a quarter wave plate to a third polarizing beam splitter which is rotated 45 degrees on its optical axis and splits the incoming beam into two beams. a fourth portion which has a polarization of −45 degrees with a phase of 90 degrees which is directed to a charge coupled device for measurement and a beam polarized at 45 degrees and a phase of zero degrees which is dumped, measuring the intensity of the cross sections of each polarized portion of the laser beam by use of an array of pixels in a charge coupled device, aligning the pixels in each charge coupled device so that the pixels measuring the same portion of the laser beam are matched, combining the data from each matched pixel in the charge coupled device into a mapping of the polarization of a laser beam by use of a computer and the proper algorithm to map the polarization across the laser beam.

* * * * *

UNITED STATES PATENT AND TRADEMARK OFFICE
CERTIFICATE OF CORRECTION

PATENT NO. : 5,073,025
DATED : December 17, 1991
INVENTOR(S) : LAWRENCE D. BROOKS It is certified that error appears in the above-identified patent and that said Letters Patent is hereby corrected as shown below:

Column 3, Line 54

Delete "polarizing of 0" and insert --polorization of 90--.

Column 4, Line 29

Delete "int h" and insert --in the--

Column 4, Line 51

Delete "tot h" and insert --to the--

Signed and Sealed this

Twenty-seventh Day of April, 1993

Attest:

MICHAEL K. KIRK

*Attesting Officer*    Acting Commissioner of Patents and Trademarks